May 19, 1959
J. M. LAZAR
2,887,332
ROTARY SHAFT SEALING MEANS
Filed Feb. 25, 1957
2 Sheets-Sheet 1
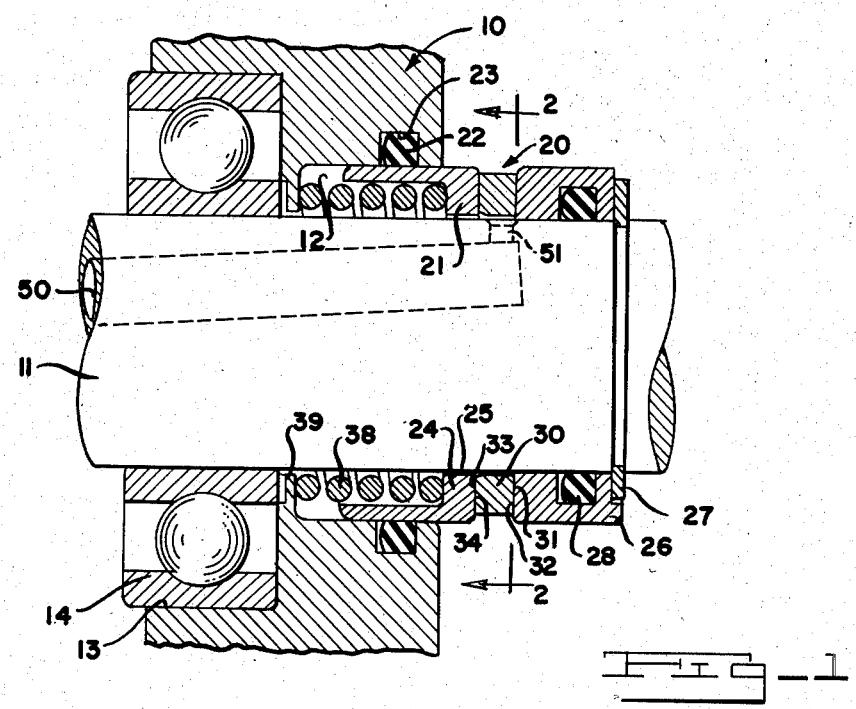
FIG-1
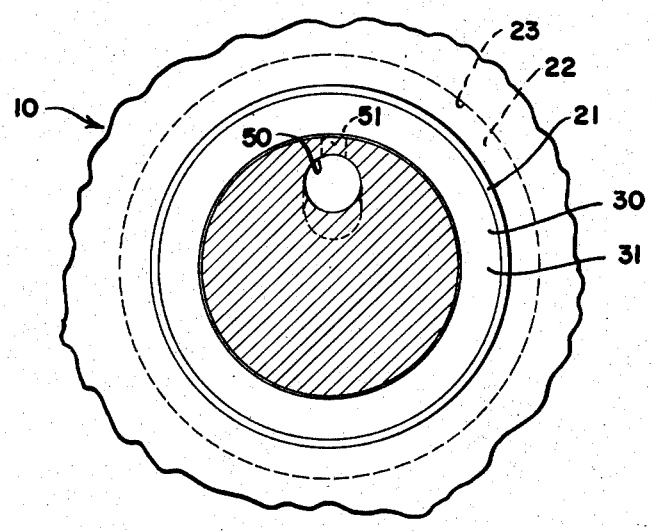
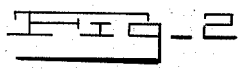
INVENTOR.
JOHN M. LAZAR
BY
Cullen & Cantor
ATTORNEYS May 19, 1959
J. M. LAZAR
2,887,332
ROTARY SHAFT SEALING MEANS
Filed Feb. 25, 1957
2 Sheets-Sheet 2
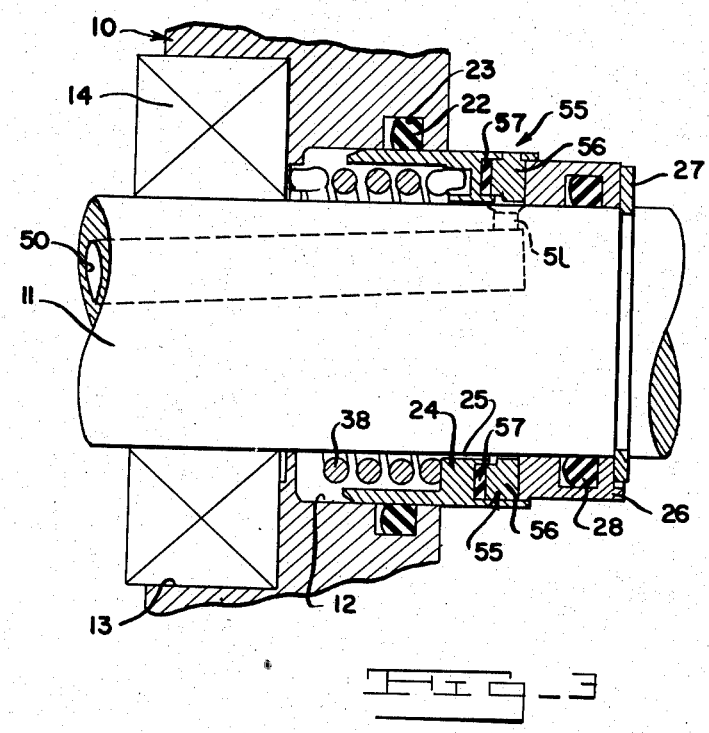
INVENTOR.
JOHN M. LAZAR
BY
Cullen & Canton
ATTORNEYS

2,887,332

ROTARY SHAFT SEALING MEANS

John M. Lazar, Detroit, Mich.

Application February 25, 1957, Serial No. 642,029

2 Claims. (Cl. 286—11.14)

This invention relates to a rotary shaft sealing means, and more particularly to a means for sealing a rotatable shaft extending through a housing wall to prevent the leakage of gas and lubricant or other fluids from between the opening in the wall and the shaft.

It is common in many pieces of mechanical equipment, such as refrigeration compressors, motors, pumps, etc., to provide a housing containing lubricant fluids and possibly gases with a rotatable shaft extending out of the housing through an opening formed in the housing wall. With this construction, it is extremely difficult and in most cases impossible to properly prevent leakage of the fluid and gas through the space between the opening and the shaft. This is particularly true where the shaft does not rotate true on its axis but instead wabbles or whips slightly.

Thus, it is an object of this invention to provide a sealing means which completely seals off any leakage between a rotatable shaft and its opening even though the shaft may wabble or run untrue on its axis.

A further object of this invention is to provide a sealing means which is formed to deflect but yet maintain a tight seal during wabbling motion of the shaft relative to the housing.

Basically, my objectives are accomplished by providing a retaining ring which is sealed to the housing and is non-rotative, a second sealing ring which is sealed to the shaft and is rotative therewith, and a deflectable or resilient sealing member interposed between the sealing ring and the retaining ring and compressed between both of these with the sealing ring being in rotative contact with the sealing member.

These and further objects of my invention will be more readily apparent upon reading the following description of which the attached drawings form a part.

With reference to the drawings, in which:

Fig. 1 is a cross-sectional view showing the shaft mounted within a housing wall and showing the sealing assembly in cross-section.

Fig. 2 is a face view taken in the direction of arrow 2 on Fig. 1.

Fig. 3 is a view similar to Fig. 1, but illustrating a modification.

With reference to the drawings, in Fig. 1 a part of a housing generally designated as 10 is illustrated. A shaft 11 which is rotatably mounted extends through an opening 12 formed in the housing. The mounting of the shaft in the opening may be achieved by enlarging the opening at 13 and providing a roller or other type of bearing 14 to support the shaft in the housing. This construction is conventional and is illustrated by way of an example.

In the absence of a sealing means, when the shaft rotates, gas if there is gas contained within the housing, and lubricant or other fluids in the housing will normally leak out through the opening 12. In order to prevent this leakage, a sealing means generally designated as 20, is provided.

The sealing means is formed first of a cup shaped sealing retainer or retainer ring 21 which is inserted in the opening 12 and is sealed to the housing 10 by means of an O-ring 22 of some resilient material such as rubber. For convenience, the O-ring may be inserted in a groove 23 formed in the wall defining the opening 12. Thus, the outside of the sealing retainer is sealed to the opening wall.

The bottom of the cup shaped sealing retainer 24 is provided with an opening 25 through which the shaft is inserted. This opening is larger than the shaft so that there is a clearance between the bottom 24 and the shaft 11.

The second major member of the sealing assembly consists of a sealing ring 26 which is fixed to the shaft by means of a conventional split retaining ring 27 or in the alternative by any suitable key (not shown). The sealing ring rotates with the shaft and is sealed to the shaft by means of a second O-ring 28 also of a resilient material such as rubber.

Thus, it can be seen that the seal retainer is sealed to the housing and normally would not rotate because of the friction of the O-ring and conversely the sealing ring is fixed to the shaft and rotates therewith.

The sealing ring and the sealing retainer are sealed to each other by means of a sealing nose 30 formed with a seal face 31 which abuts a flat seal face 32 on the sealing ring and also formed with a sealing face 33 which abuts against a flat sealing face 34 on the sealing retainer. The sealing faces are all held in tight face to face contact by a spring means which may be in the form of a coil compression spring 38 having one end abutted against a shoulder 39 formed in the opening 12 of the housing and the opposite end abutted against the bottom 24 of the cup shaped sealer retainer.

It is desirable that the sealing nose be formed of a relatively hard material which is wear resistant and has a low coefficient of friction but is somewhat resilient so as to deflect should the shaft wabble. Many types of plastic materials are suitable for this, so long as they have the characteristic of being somewhat resilient but also having a relatively low coefficient of friction.

In operation, when the shaft 11 is rotated, the sealing ring rotates with it and forms a rubbing contact against the face 31 of the sealing nose. The sealing nose normally does not rotate because of its frictional contact with the sealing retainer which is held from rotating in the opening of the housing, although at times the sealing nose may overcome the friction of the stationary sealing retainer and rotate also. The spring biases the three members tightly together so that a three point seal is obtained. The first point is between the housing and the sealing retainer. The second point is between the sealing retainer and the sealing ring, and the third point is between the sealing ring and the shaft.

In some types of construction, it is desirable to have an oil opening drilled in the shaft to lubricate the bearing. Thus, an opening 50 is illustrated as being drilled in the shaft to exhaust lubricant through an exhaust port 51 opening underneath the sealing nose which is slightly spaced away from the shaft because of having a larger internal diameter than the external diameter of the shaft. The lubricant then passes through the opening 25 in the cup bottom 24 around the spring 38 around the shoulder 39 and into and through the bearing 14. It can be seen that with the lubricant circulating this way, leakage of lubricant out of the housing is prevented because of the tight face to face contact between the face 31 on the sealing nose 30 and the face 32 on the sealing ring 26.

Should there be any misalignment of the shaft or any wabbling of the shaft which is quite common in almost every rotatable shaft and particularly those that are rotated high speed, then this misalignment is compensated for by the deflection of the somewhat resilient sealing nose between the sealing ring and the sealing retainer. This resilient deflection of the sealing nose still tightly seals the various faces together as the sealing ring rotates relative to the sealing nose.

In some applications, it is desirable to provide a great deal of deflection in the sealing nose to compensate for what could be a large deflection of the shaft or a large wabbling of the shaft and this is accomplished in the modification shown in Fig. 3. In this modification, the structural parts are the same as that shown in Fig. 1 with the exception that the sealing nose designated here as 55 is formed in two parts: One part 56 being of a hard, wear resistant, somewhat resilient material having a low coefficient of friction, and the other part 57 being of a highly resilient material such as rubber having a high coefficient of friction. In this case, the highly resilient section 57 is tightly pressed between the section 56 and the retaining ring so that both it and the sealing retainer do not rotate. On the other hand, the sealing ring rotates against the face of the harder wear resistant part 56. The sealing nose thus will deflect a large amount in response to wabbling of the sealing ring because of the easily deflected resilient section 57. This construction would compensate for even the worst possible cases of shaft misalignment.

In addition, in this construction, it is contemplated to provide a shroud or cylindrical extension 59 from the base of the cup 25 of the sealing retainer. This shroud surrounds the sealing nose and prevents plastic flow of the sealing nose out from between the sealing ring and the sealing retainer.

This invention may be further developed within the scope of the following attached claims and accordingly it is desired that the foregoing description be read as being merely illustrative of an operative embodiment of my invention and not in a strictly limiting sense.

I now claim:

1. A sealing means for a shaft rotatably mounted in a housing and extending out of the housing through an opening in the housing wall, comprising a cup-shaped sealing retainer in the form of an elongated tube opened at one end and having a radially inwardly directed, centrally apertured base through which the shaft is loosely inserted, with the tube being substantially axially aligned with the shaft, the tube being inserted within the opening and having its outer wall surface positioned closely to the wall defining the opening in the housing and its inner wall surface spaced a short distance from the shaft surface; a coil spring surrounding the shaft and having a substantial part of its length arranged within the tube between the tube inner wall and the shaft surface and having one end abutting the base and its opposite end arranged against a portion of the housing and spring urging the sealing retainer in an axial direction taken from its open end towards its base end; a resilient, narrow cross-section, O-ring encircling the outside wall of the tube and sealing said outside wall to the wall defining the housing opening; the sealing retainer base surface outside of the tube being flat; a sealing nose in the form of a narrow ring loosely fitted around the shaft and having a pair of parallel flat end faces with one end face arranged in face to face contact with the sealing retainer outside base surface; a retaining ring closely surrounding the shaft and having a flat sealing face in face to face contact with the opposite face of the sealing nose, the retaining ring being detachably secured to the shaft for rotation therewith, and means sealing the inside wall of the retaining ring to the outside of the shaft; said spring urging the sealing retainer into tight contact with the sealing nose and the sealing nose into tight contact with the retaining ring to form tight seals therebetween, and the sealing nose face contacting the retaining ring being hard and smooth and the sealing nose being formed of a resiliently deformable material, whereby wabbling of the rotating shaft and attached retaining ring relative to the shaft axis resiliently deforms the sealing nose, but does not break the seal formed between the sealing nose faces and the retaining ring and sealing retainer respectively; the seal formed between the sealing retainer and the housing opening wall, and the seal formed between the retaining ring and the shaft.

2. A construction as defined in claim 1, and the means sealing the retaining ring to the shaft comprising a groove formed in the inside peripheral wall of the retaining ring and a resilient ring fitted into the groove, completely encircling the shaft, and tightly fitted against the shaft to form a tight seal between the shaft and retaining ring.

References Cited in the file of this patent

UNITED STATES PATENTS

| | | |
|---|---|---|
| 1,772,093 | Wilson | Aug. 5, 1930 |
| 1,788,966 | Wilson | Jan. 31, 1931 |
| 2,048,581 | Weiher | July 21, 1936 |
| 2,250,311 | Meyer | July 22, 1941 |
| 2,475,316 | Garraway | July 5, 1949 |
| 2,586,739 | Summers | Feb. 19, 1952 |
| 2,668,068 | Bredimeier | Feb. 2, 1954 |